April 2, 1929. O. C. ROOS 1,707,944
ELECTROMAGNETIC WAVE RECEIVING SYSTEM
Original Filed Oct. 6, 1921
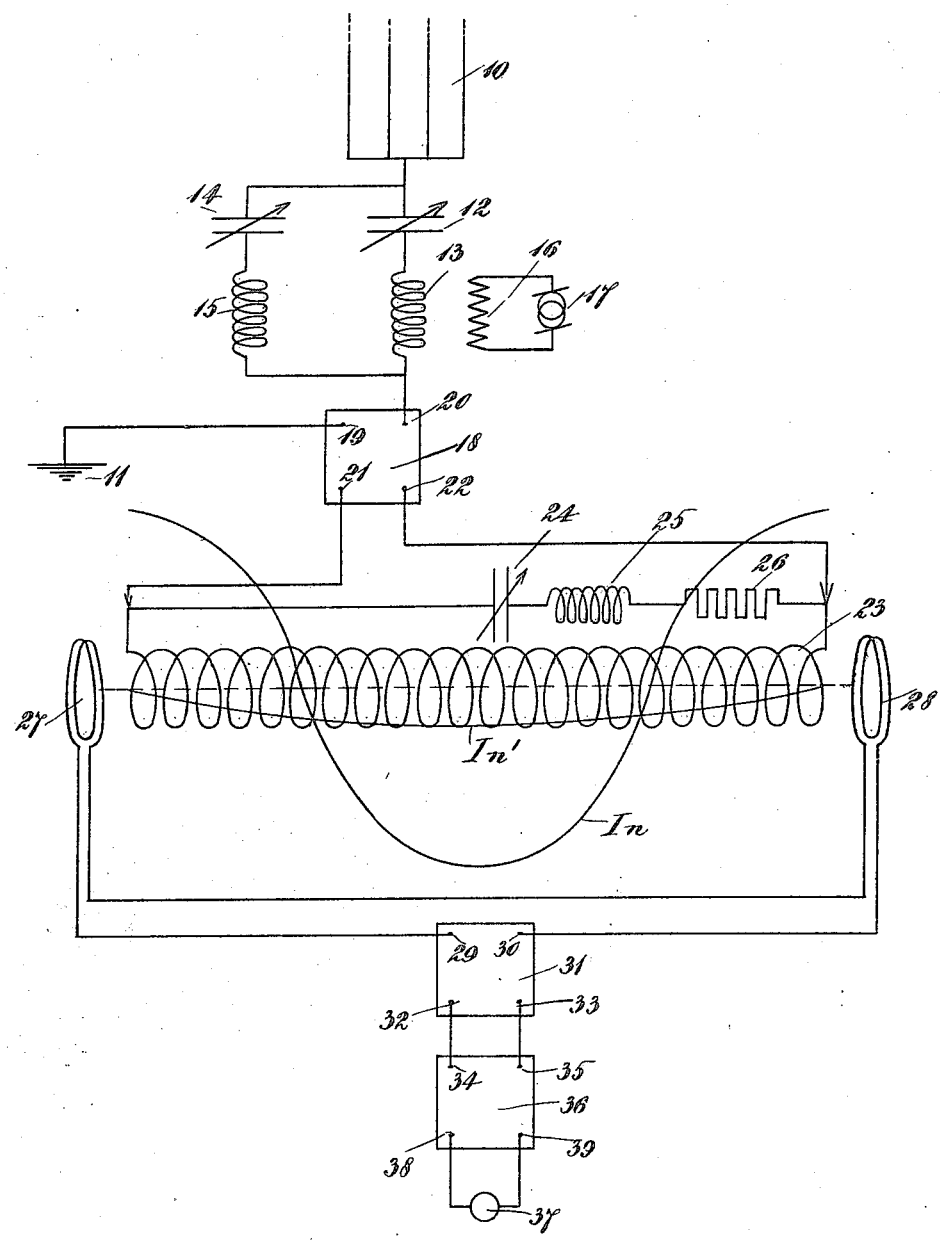

Patented Apr. 2, 1929.

1,707,944

UNITED STATES PATENT OFFICE.

OSCAR C. ROOS, OF BRONX, NEW YORK.

ELECTROMAGNETIC-WAVE RECEIVING SYSTEM.

Original application filed October 6, 1921, Serial No. 505,785. Divided and this application filed November 27, 1925. Serial No. 71,619.

My invention relates to electromagnetic-wave receiving-systems and more especially to such systems whereby the effect on the oscillation detector of electrical vibrations created in the system by abrupt or impulsive electrical forces, such for example as "static disturbances", so called, is eliminated or reduced to a minimum so that the signal-interference ratio is a maximum.

With this object in view my invention comprises as its salient features an electrical apparatus for converting abrupt or impulsive electrical forces into periodic vibrations of predetermined frequency, spatialized or not as the case may be, and an electrical apparatus for spatializing said periodic vibrations so resulting from such abrupt or impulsive electrical forces and for spatializing the electrical vibrations created in the receiving system by the electromagnetic waves the energy of which is to be received.

The first-mentioned apparatus may conveniently be referred to as a "reverberator" and the second as a "spatializer". The reverberator may consist of any instrumentality such as a circuit, either closed or open, which is caused to vibrate periodically by abrupt or impulsive electrical forces. The spatializer may best consist of a slow-speed circuit, which, as is well understood, is a circuit having its electromagnetic constants continuously and uniformly distributed as in the case of an open or closed solenoid. The properties of such slow-speed circuits are well understood by those skilled in the art and need not be set forth at length herein, except to point out that such a circuit, in order to perform the function of a spatializer must be so designed as to permit the development therein of at least a quarter wave length of an electric wave.

In carrying out my invention I employ means for conductively connecting the spatializer with the reverberator, and other means for electrically associating the oscillation detector with the spatializer.

My invention contemplates, in general, a conducting member so electrically associating the oscillation detector with the reverberator that the ratio of the amplitude therein of the vibrations to be received to the amplitude therein of the vibrations resulting from the abrupt or impulsive electrical forces is as large as may be, and in special cases where the reverberator also performs the functions of a spatializer, said member may be a simple conductor. Preferably the reverberator is designed to have its most pronounced natural rate of vibration, or if it is a spatializer as well as reverberator, its fundamental natural period, different from that of the waves the energy of which is to be received, and the slow-speed circuit is designed to have its fundamental natural period or one of its harmonics equal to the most pronounced rate of vibration of the reverberator, and in the special cases aforesaid where the reverberator performs the functions of a spatializer the slow-speed circuit is designed to have its fundamental or one of its harmonics equal to the fundamental natural period or one of the harmonics of the reverberator,—in general, one of the natural rates of vibration of said slow-speed circuit is made equal to one of the natural rates of vibration of said reverberator. As hereinafter more fully set forth, the reverberator, except in certain special cases, must have two degrees of freedom, or two natural rates of vibration, one of which is the frequency of the waves, the energy of which is to be received, and the other, which is its most pronounced natural rate of vibration, the frequency developed therein by abrupt or impulsive electrical forces. Where the reverberator performs the function also of a spatializer, it must in general have two degrees of freedom, as above set forth, and the spatializer must also have two degrees of freedom or two natural rates of vibration corresponding respectively to the two natural rates of the reverberator, one being the frequency of the waves the energy of which is to be received, and the other that of the vibrations developed therein by abrupt or impulsive electrical forces.

In my application Serial No. 505,785, filed Oct. 6, 1921, of which this application is a division, I have shown and claimed systems in which the reverberator performs the functions of a spatializer.

In the system shown in the present application the reverberator does not perform the functions of a spatializer.

By spatializing the electrical vibrations developed in the system by abrupt or impulsive electrical forces and those resulting from the waves the energy of which is to be received, I am enabled to associate the oscillation detector with the spatializer at a point or points where the amplitude of the vibrations to be received is substantially larger than that of the vibrations resulting from the abrupt or impulsive electrical forces and thereby eliminate or reduce to a minimum the effect of the latter on said detector.

It will be obvious that the principle underlying my invention may be embodied in a multiplicity of apparatus and circuit arrangements, and therefore it will be understood that the system hereinafter particularly described is illustrative merely and not restrictive.

In the drawings accompanying and forming a part of this specification the figure is a diagram of an electromagnetic wave receiving system embodying my invention.

In the particular drawings selected for more fully disclosing the principle of my invention, the aerial or elevated conductor system 10 is connected to earth at 11 through the parallel-branch circuit having the condenser 12 and inductance 13 serially included in one branch and the condenser 14 and inductance 15 serially included in the other, the inductance 13 serving in this instance as the secondary for the primary 16 of the heterodyne oscillator 17 shown in the present instance as an alternating current generator.

The aerial as a whole is attuned to the frequency $n$ of the waves to be received and on account of the presence of the parallel-branch circuit, said system has a plurality of degrees of freedom, its most pronounced rate of vibration being the frequency $n'$. Abrupt or impulsive electrical forces will cause the aerial and the parallel-branch circuit to develop vibrations of two frequencies, one of which, $n'$, has an amplitude much greater than the other, and the periodic vibrations of said frequency, together with those created in the aerial system by the waves the energy of which is to be received, are amplified by the radio-frequency amplifier 18, the input terminals of which are shown at 19, 20, and the output terminals thereof at 21, 22.

The effective radio-frequency of the vibrations to be received is under the control of the receiving operator when the heterodyne is used. By the "effective radio frequency," I do not mean the "beat tone" which is numerically equal to the difference between the frequency $n$ of the signal waves and the frequency of the vibrations produced by the heterodyne, said beat-tone being an audio-frequency, but I use this term to define the arithmetic means of said frequency which is of course a radio-frequency.

It will be understood without further explanation that when the heterodyne is employed, the frequency $n$ of the vibrations to be received is the "effective radio frequency", that is, the frequency of the signal waves or the vibrations created by said waves and modified by said heterodyne, and that when the heterodyne is not used, said frequency $n$ is that of the signal waves or the vibrations created by said waves without modification by said heterodyne.

Conductively connected to the output terminals of the radio-frequency amplifier 18 is a rejector slow-speed circuit 23 which, vibrating at the half wave length for vibrations of frequency $n'$ created by abrupt or impulsive electrical forces in the parallel-branch reverberator circuit, develops an enormously high impedance for vibrations of said frequency and acts as a rejector circuit for vibrations of said frequency and for all odd harmonics thereof, being in fact the equivalent of the usual rejector circuit consisting of two parallel branches one of which, for the frequency to be rejected, has an equivalent capacity reactance, and the other a numerically-equal equivalent inductance reactance. Such rejector slow-speed circuit will almost completely prevent the transmission of vibrations of said frequency $n'$, but will offer very little impedance to the passage therethrough of periodic vibrations of the frequency $n$.

Connected across the terminals of said slow-speed circuit 23 is a shunt absorbing-circuit including the serially-connected condenser 24, inductance 25 and resistance 26, said circuit being attuned to the frequeny $n'$ and thereby still further reducing the amplitude of the current-standing-wave $In'$ formed in said slow-speed circuit by the vibrations which are not to be received.

The curve $In$ represents the current-stationary wave developed in said slow-speed circuit by the vibrations of frequency $n$ which are to be received and the oscillation detector in this instance is associated inductively with said slow-speed circuit by the secondaries 27, 28 at points where the amplitude of the vibrations to be received is a maximum and the amplitude of the undesired vibrations $n'$ is substantially zero.

For convenience of illustration, said secondaries are shown slightly removed from the ends of the slow-speed circuit. Preferably said secondaries are serially connected with the input terminals 29, 30 of the radio-frequency amplifier 31 and the output terminals 32, 33 of the latter are connected with the input terminals 34, 35 of the audio-frequency amplifier 36, the signal-indicating device 37 being connected to the output terminals 38, 39 of said audio-frequency amplifier.

In the present instance the fundamental of the slow-speed circuit 23 is equal to the most pronounced rate of vibration $n'$ of the reverberator parallel-branch circuit, and its first even harmonic is equal to the frequency $n$ of the vibrations to be received.

The system herein particularly described for the purpose of more fully disclosing my invention involves the application of my discovery that the vibrations created in a receiving system by abrupt or impulsive electrical forces may be spatialized in a suitable instrumentality, and that by spatializing in the same instrumentality the vibrations to be received, the two sets of vibrations may be segregated.

The best apparatus known to me at the present time for effecting such a spatialization and segregation of the two sets of vibrations is a slow-speed circuit, but it is to be understood that I do not limit my invention to the use of the same.

It will be obvious that the principle underlying my invention can be embodied in numerous forms of apparatus and circuit arrangements and therefore it is to be understood that my invention, as defined by the appended claims, is not to be limited to the particular form of apparatus and circuit arrangement herein specifically described.

I claim:—

1. An electromagnetic-wave receiving-system comprising in combination means for converting abrupt or impulsive electrical forces into persistent periodic vibrations of predetermined frequency, an oscillation detector, a slow-speed circuit having its electromagnetic constants continuously and uniformly distributed and being constructed and arranged to permit the development therein of standing waves without appreciable attenuation, said slow-speed circuit having its fundamental natural period equal to the most pronounced natural rate of vibration of said means, means conductively connecting said slow-speed circuit with said means and means electrically associating said detector with said slow-speed circuit.

2. An electromagnetic-wave receiving-system comprising in combination means for converting abrupt or impulsive electrical forces into persistent periodic vibrations of predetermined frequency, an oscillation detector, a slow-speed circuit having its electromagnetic constants continuously and uniformly distributed and being constructed and arranged to permit the development therein of standing waves without appreciable attenuation, said slow-speed circuit having one of its natural rates of vibration equal to one of the natural rates of vibration of said means, means conductively connecting said slow-speed circuit with said means and means electrically associating said detector with said slow-speed circuit.

3. An electromagnetic-wave receiving-system comprising in combination means for converting abrupt or impulsive electrical forces into persistent periodic vibrations of predetermined frequency, an oscillation detector, a slow-speed circuit said slow-speed circuit having its electromagnetic constants continuously and uniformly distributed and being constructed and arranged to permit the development therein of standing waves without appreciable attenuation, said slow-speed circuit being serially connected to said means and having one of its natural rates of vibration equal to one of the natural rates of vibration of said means, a circuit resonant to one of the natural rates of vibration of said slow-speed circuit and connected across the terminals thereof, and means electrically associating said detector with said slow-speed circuit.

4. An electromagnetic-wave receiving-system comprising in combination means for converting abrupt or impulsive electrical forces into persistent periodic vibrations of predetermined frequency, an oscillation detector, a slow-speed circuit said slow-speed circuit having its electromagnetic constants continuously and uniformly distributed and being constructed and arranged to permit the development therein of standing waves without appreciable attenuation, said slow-speed circuit being serially connected to said means and having its fundamental equal to the frequency of the vibrations resulting from said abrupt or impulsive electrical forces, a circuit resonant to said frequency and connected across the terminals of said slow-speed circuit, and means electrically associating said detector with said slow-speed circuit.

In testimony whereof, I have hereunto subscribed my name this 17 day of November, 1925.

OSCAR C. ROOS.